United States Patent [19]

Ito et al.

[11] Patent Number: 4,717,983
[45] Date of Patent: Jan. 5, 1988

[54] DEVICE FOR OPERATING A PLUNGER IN A TAPE PLAYER

[75] Inventors: Yukio Ito; Shigeo Kinoshita, both of Tokyo, Japan

[73] Assignee: Clarion Co., Ltd, Tokyo, Japan

[21] Appl. No.: 720,215

[22] Filed: Apr. 5, 1985

[30] Foreign Application Priority Data

Apr. 6, 1984 [JP] Japan ................... 59-68864
Apr. 6, 1984 [JP] Japan ................... 59-68865
Jun. 8, 1984 [JP] Japan ................... 59-117652

[51] Int. Cl.$^4$ .......................................... G11B 15/00
[52] U.S. Cl. ................................................... 360/137
[58] Field of Search ................ 360/90, 93, 105, 137

[56] References Cited

U.S. PATENT DOCUMENTS

| | | | |
|---|---|---|---|
| 4,393,426 | 7/1983 | Nakanishi | 360/105 |
| 4,519,269 | 5/1985 | Itoh et al. | 360/105 |
| 4,547,823 | 10/1985 | Ri et al. | 360/90 |
| 4,568,989 | 2/1986 | Ohhara et al. | 360/105 |
| 4,574,322 | 3/1986 | Teraguchi et al. | 360/74.1 |
| 4,581,665 | 4/1986 | Ito et al. | 360/90 |
| 4,586,103 | 4/1986 | Uehara | 360/90 |
| 4,614,987 | 9/1986 | Sukenari et al. | 360/90 |
| 4,656,552 | 4/1987 | Takahashi et al. | 360/137 |

Primary Examiner—Robert S. Tupper
Assistant Examiner—Matthew J. Bussan
Attorney, Agent, or Firm—Flynn, Thiel, Boutell & Tanis

[57] ABSTRACT

A plunger operating mechanism in a tape player comprises: a head lock plate linked to a head plate normally biased to its withdrawal position by a stop mode spring; a drive means engaging the head lock plate to pull it in a direction for advance of the head plate; a lock means to lock the head lock plate brought ahead by the drive means to place the head plate at the advance position; stress plates individually linked to two attractive plungers and locked by the plungers when energized so that the engagement between the head lock plate and the drive means is maintained by a least one stress plate locked by the energized plunger; fast-forwarding and rewinding control plates linked to the two stress plates to establish the fast-forwarding or rewinding mode so that one of the control plates is set in the fast-forwarding or rewinding mode when one of the plungers is energized but neither control plate is set in a mode other than the fast-forwarding and rewinding mode in which both plungers are energized; position control means linked to the plungers to limit the advance stroke of the head plate to a fast-forwarding or rewinding position when only one of the plungers is deenergized; and a distance adjusting means provided between the head plate and the drive means to adjust the distance between the head plate and the drive means to place the head plate at the fast-forwarding and rewinding position.

8 Claims, 20 Drawing Figures

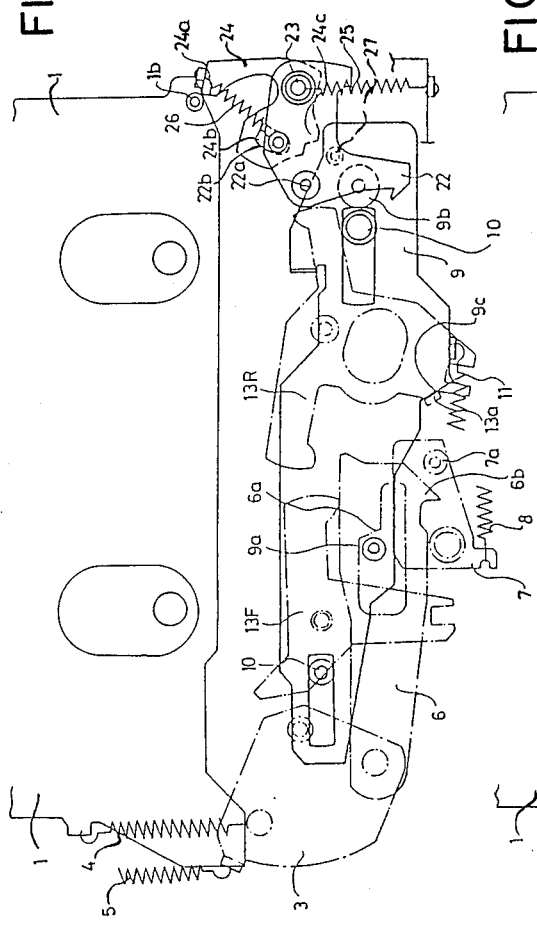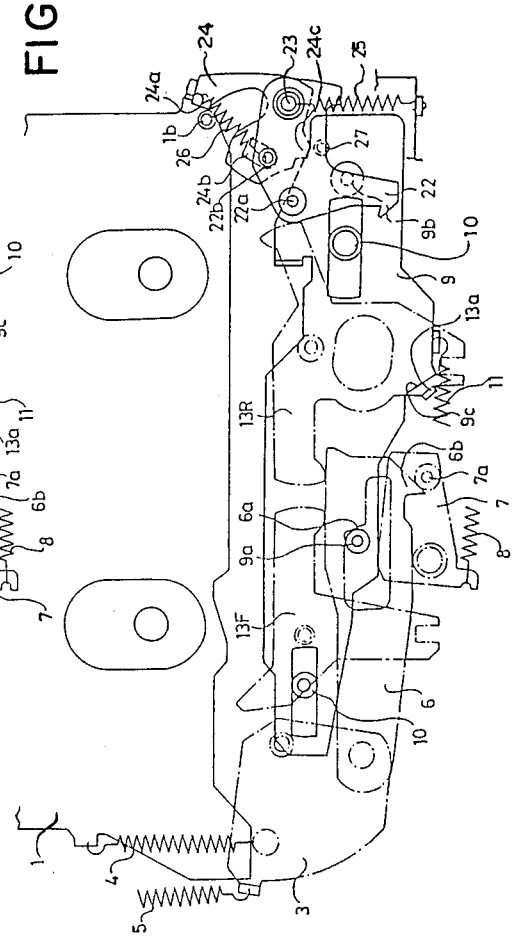

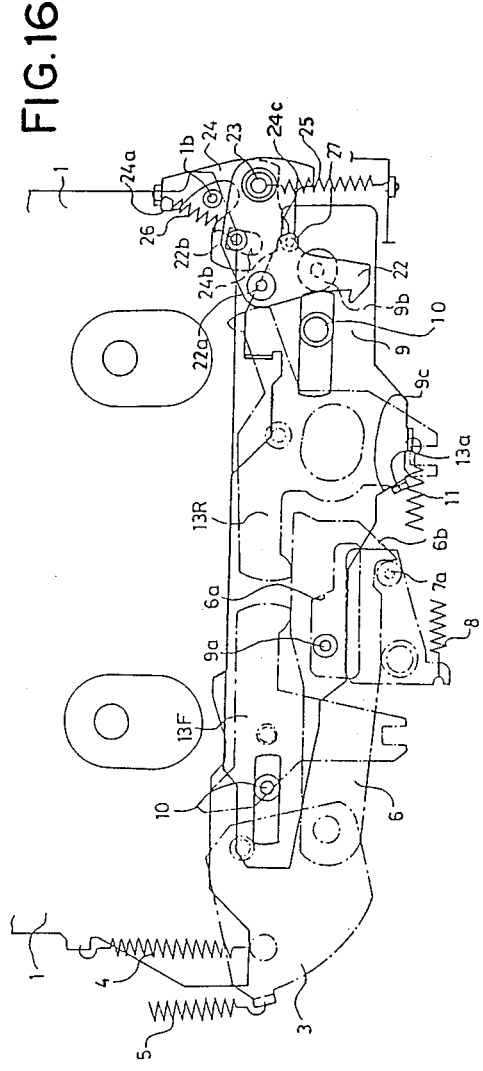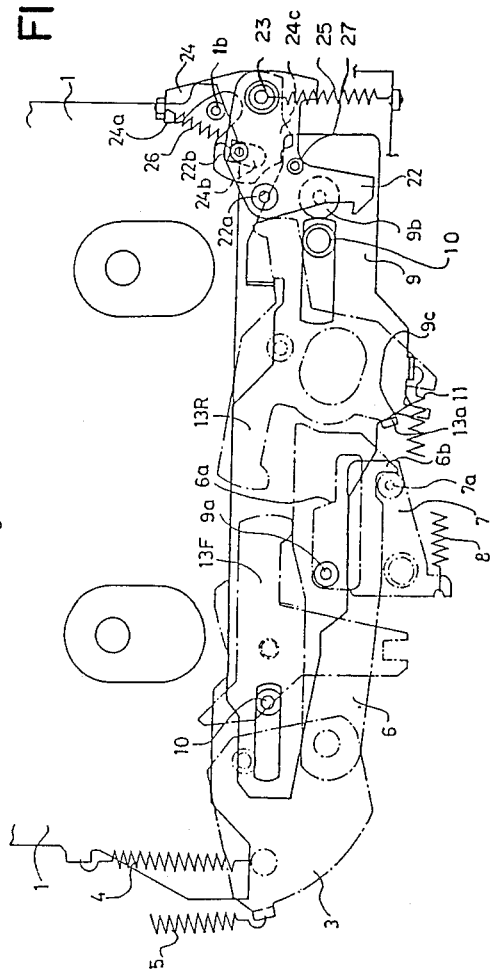

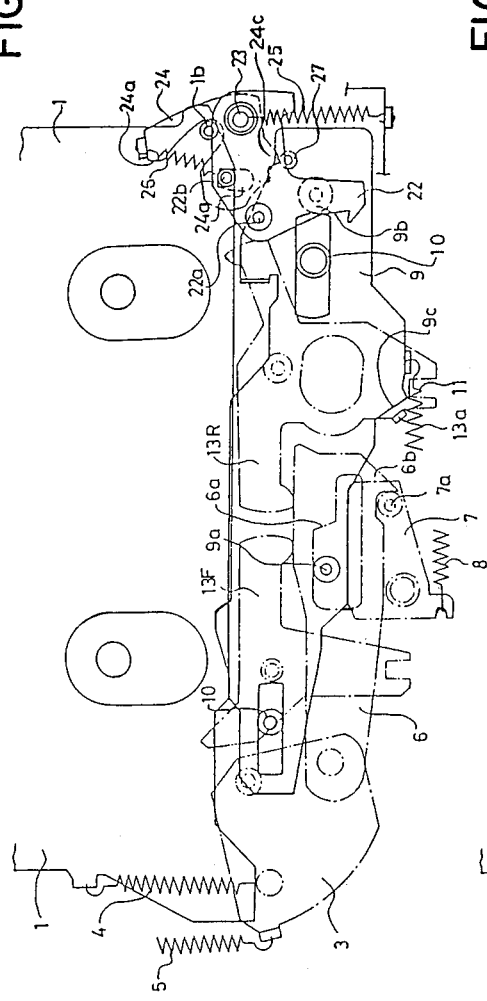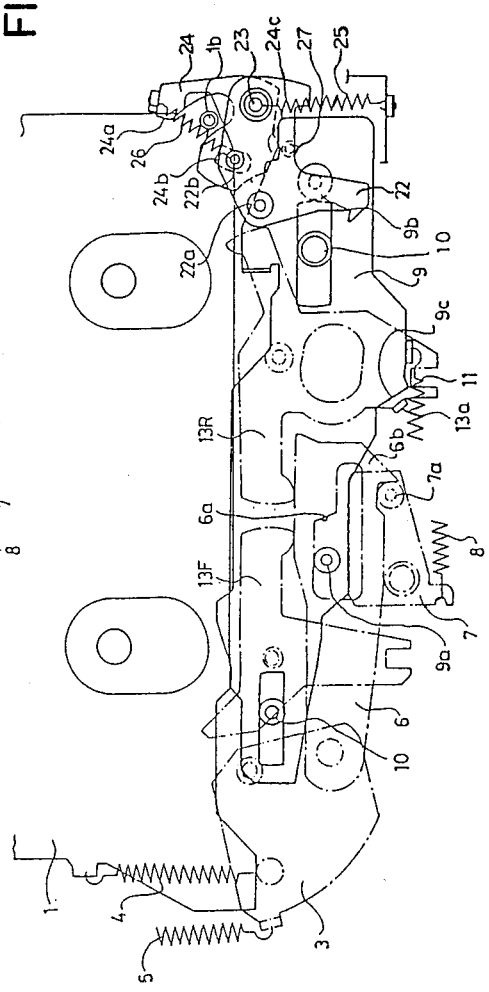

DEVICE FOR OPERATING A PLUNGER IN A TAPE PLAYER

FIELD OF THE INVENTION

This invention relates to a device for operating a plunger in a tape player upon mode change for the purpose of program selection.

BACKGROUND OF THE INVENTION

Tape players in general are operable in four modes, i.e., stop, play, fast-forwarding and rewinding modes. The most automated tape player alleviates the manual force for changing the mode from one to another, by using electromagnetic plungers and a motor to maintain or change the mode in response to a small manual force to a switch.

The automated tape player, however, is complicated in structure as compared to a manually operated tape player. A strong demand arose in the industry to reduce the number of parts, in particular, the number of electromagnetic plungers which are complicated in structure and require more fabrication steps than other parts made by sheet metal working. To meet the requirement, the industry made an attempt to make a single plunger govern plural modes.

There is also a parallel demand for a small-scaled tape player. This requires replacement of a suction-type plunger by a small-scaled, attraction-type plunger.

PROBLEMS INVOLVED IN THE PRIOR ART

If the attractive plungers are used to maintain or change the mode, however, it is extremely difficult to reduce the number of the plungers. The suction-type plunger is relatively readily reconstructed to effect two different operations, one established by sucking the core thereinto during energization and the other established by pulling the core with a spring energy in the opposite direction during deenergization. The attractive plunger, however, cannot attract the core with its own magnetic force, and requires a spring biasing the core toward the plunger. Therefore, the attractive plunger cannot effect another operation which would be attained by the opposite displacement of the core.

Thus it is more difficult to construct the attractive plunger to effect plural operations than the suction plunger. Therefore, the industry in practice has been reconciled to a reduction of the attractive plungers to three so that the first plunger maintains the play mode, and the second and third plungers establish the fast-forwarding and rewinding modes, thereby controlling the four modes.

OBJECT OF THE INVENTION

It is therefore an object of the invention to further approach the demand in the industry and provide a plunger operating device capable of establishing all the four modes by use of only two attractive plungers.

SUMMARY OF THE INVENTION

In accordance with the invention, there is provided a plunger operating mechanism in a tape player comprising:
 a stop mode spring;
 a head plate normally biased by said stop mode spring toward its withdrawal position;
 a head lock plate operatively linked to said head plate;
 drive means engaged by said head lock plate to pull it in a direction to move said head plate ahead;
 first lock means engageable with said head lock plate moved ahead by said drive means to lock it at a position to hold said head plate in position;
 two attractive plungers;
 two stress plates each cooperable with one of said plungers so as to be locked thereby when energized;
 fast-forwarding and rewinding control plates each cooperable with one of said stress plates;
 means for respectively setting said fast-forwarding or rewinding control plate operative in the fast-forwarding or rewinding mode when a respective one of said plungers is energized and for setting both control plates inoperative in a mode other than fast-forwarding mode or rewinding mode; and
 position control means linked to said plungers to limit the advance of said head plate to its fast-forwarding or rewinding position when only one of said plungers is deenergized.

The invention will be better understood from the description given below, referring to some preferred embodiments illustrated.

BRIEF DESCRIPTION OF THE DRAWINGS

FIGS. 14 through 19 are plan views of a position detecting system, in different modes, for the mechanism of FIG. 1.

DETAILED DESCRIPTION OF THE PREFERRED EMBODIMENTS

Figure 3:
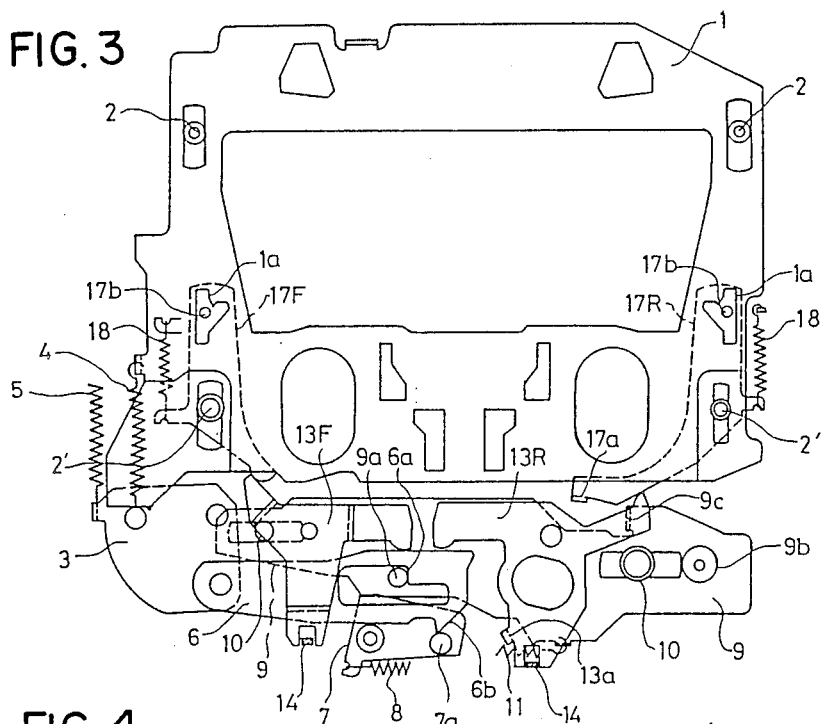
FIG. 3 is a plan view of the mechanism of FIG. 1 and disposed in a change to the play mode.

(1) Construction (i) Head Plate (FIGS. 1 through 8)

A head plate 1 carries a head (not shown) and is supported by right and left guide pins 2 and 2' movably up and down in the figures. The guide pins 2 and 2' are secured to a base plate of a tape player.

The head takes the play position to closely contact a tape when the head plate 1 is placed ahead (at the lowest position in the figures), takes the fast-forwarding or rewinding position to slightly contact the tape when the head plate 1 is slightly withdrawn from the play position, and takes the stop position to exit from the tape cassette and stand apart from the tape when the head plate 1 is fully withdrawn (to the uppermost position in the figures). A means (not shown) is linked to the head plate 1 to control a drive system of the tape player (including reel bases, capstans and pinch rollers) between its stop and play positions.

To the left and front of the head plate 1 in the figures is pivotably mounted a link 3 by a shaft 3a secured to the base plate. A pin 3b is secured to an end of the link 3 and is opposed to a push portion formed at an end of the head plate 1. A spring 4 is interposed and connected between the link 3 and the head plate 1 to normally pull them toward each other. The spring 4 is a displacement absorbing means to resiliently adjust the distance between the head plate 1 and a drive means therefor in the fast-forwarding and rewinding modes.

A stop mode spring 5 is connected between the link 3 and the base plate to bias the link 3 and the head plate 1 linked thereto via the pin toward their withdrawal positions. The stop mode spring 5 has an energy overcoming resilient forces (of a spring for assisting attraction of the plunger and a spring for rotating a fast-forwarding and rewinding control plate) which will be described later.

(ii) Head Lock Plate (FIGS. 1 through 8)

A head lock plate 6 is movably connected at a proximal end thereof to the other end of the link 3 via a pin. The head lock plate 6 extends horizontally in the figures and is pivotable up and down about the pin at the proximal end. The head lock plate 6 has an engagement hole including a tapered engagement portion 6a and a relief portion nearer to the distal end thereof and engaging a push projection of a power plate which will be described later.

The distal end of the head lock plate 6 has integrally formed a hook-shaped engagement portion 6b for fixing the head lock plate 6 when moved ahead.

A lock plate 7 is pivotably supported by an axle on the base plate and is opposed to the hook-shaped engagement portion 6b. The lock plate 7 has a roller-shaped engagement member 7a engageable with the hook-shaped engagement portion 6b. That is, the lock plate 7 is normally biased by a spring 8 in the counterclockwise direction to urge the roller-shaped engagement member 7a into the hook-shaped engagement portion 6b.

(iii) Drive Means (FIGS. 1 through 8 and 9)

A drive means is provided under the head lock plate 6 to pull it.

The drive means in this embodiment includes a power plate 9 extending parallel to the head lock plate 6 and an intermittent gear 12 to reciprocally drive the power plate 9.

The power plate 9 is reciprocally guided by right and left pins 10 secured to the base plate, and is biased to in the left in the figures by a spring 11. When a plunger is energized and magnetized as will be described later, however, the power plate 9 is locked and maintained in a stand-by position by locking engagement of an engagement portion thereof with a lock portion 13a of a stress plate 13R linked to the plunger. A pin-shaped push projection 9a is secured to one surface of the power plate 9 and inserted in the engage hole 6a of the head lock plate 6. A roller 9b is rotatably provided on the distal end (the right end) of the power plate 9 and contacts the outer periphery of a cam 12b integrally formed on the surface of the intermittent gear 12 selectively rotated by the motor.

The intermittent gear 12 has a non-toothed portion along the periphery thereof so that it does not rotate when a drive gear 12a linked to the motor is opposed to the non-toothed portion. The roller 9b is closely compressed to the contour of the cam 12b on the intermittent gear 12 by the spring 11 biasing the power plate 9 to the left. The contour of the cam 12b is such that the roller 9b contacting it moves, starting from a stop portion A to disengage the intermittent gear 12 from the drive gear 12a, along a call-in portion connecting the stop portion A to the smallest radius portion, onto the small radius portion nearest to the axis of the cam, then to a large radius portion remotest from the axis of the cam, thereafter returning to the stop portion A. While the stress plate 13R is engaged due to the attractive force of the plunger, the power plate 9 is maintained at the stand-by position so as to put the roller 9b between the portions A and A' and to align the non-toothed portion of the intermittent gear with the drive gear. Therefore, when the plunger is deenergized, the lock portion 13a of the stress plate 13 is unlocked, and the power plate 9 is moved to the left by the spring 11 so that the roller 9b pushes the stop portion A (which is a sloped surface) so as to rotate the intermittent gear 12 into engagement with the drive gear.

(iv) Stress Plate (FIGS. 1 through 8 and 10)

The fast-forwarding stress plate 13F and the rewinding stress plate 13R are placed above the head lock plate 6 and the power plate 9 and are rotatable about their respective axles. The stress plates 13F and 13R each have three radial arms and are mounted symmetrically about the center line of the tape player.

Figure 10:
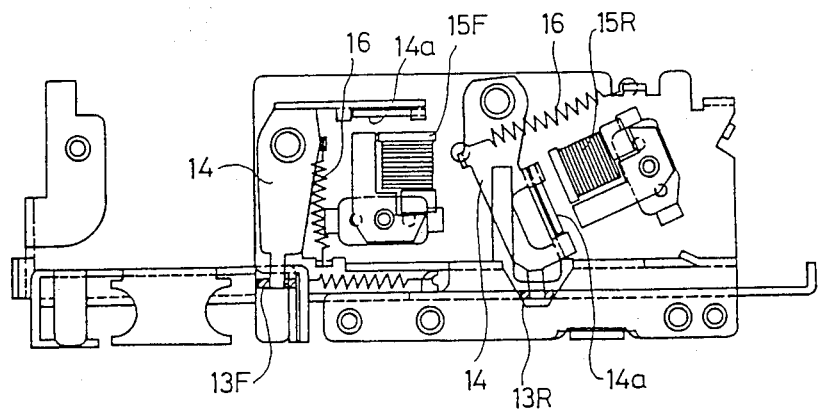
FIG. 10 is a side elevation of attractive plungers for the mechanism of FIG. 1.

The arms downwardly extending in the figures are engagement portions to engage the fast-forwarding and rewinding plungers respectively. The distal end of the engagement portion engages one end of a link 14 pivotably mounted on a side plate of the tape player by an axle as shown in FIG. 10, and a core 14a united to the link 14 is opposed to the fast-forwarding plunger 15F or the rewinding plunger 15R. A spring 16 is connected between the individual link 14 and the corresponding side plate of the tape player to pull the link 14 toward the attractive plunger. The springs 16 and links 14 bias the fast-forwarding (left) stress plate 13F clockwise and the rewinding (right) stress plate 13R counterclockwise.

The plunger engagement portion of the rewinding stress plate 13R has a lock portion 13a engageable with the power plate 9 to serve as a lock means to lockingly maintain the drive means at the stop position. The lock portion 13a of the stress plate 13R (when plate 13R is attracted by the plunger 15R) engages the power plate and hence prevents the power plate from retreating to the left in the figures with the energy of the spring 11, thereby reliably maintaining the non-toothed portion of the intermittent gear 12 in alignment with the drive gear 12a.

The second arm of each stress plate 13 extends toward the center of the tape player and has at the distal end thereof a stress portion slidably contacting the upper edge portion of the head lock plate 6. The stress portions are normally biased to the head lock plate 6 by the plunger attraction spring 16.

The third arms of the stress plates 13F and 13R are operating portions 13e to act on the fast-forwarding and rewinding control plates 17F and 17R.

(v) Fast-forwarding and Rewinding Control Plates (FIGS. 1 through 8)

The fast-forwarding control plate 17F and the rewinding control plate 17R are pivotably supported by the pins 2' which guide the movement of the head plate 1. The fast-forwarding control plate 17F is biased clockwise and the rewinding control plate 17R counterclockwise by springs 18 connected respectively between the base plate of the tape player and the levers 17F and 17R.

The lower ends of the control plates 17F and 17R are engage portions to engage the operating portions 13e of the stress plates 13F and 13R. The engage portion of the rewinding control plate 17R has formed a lock portion 17a engageable with a projection 9c of the power plate 9. The lock portion 17a abuts the projection 9c and prevents the power plate 9 from moving when the head plate is activated in the off-state of the rewinding plunger and a pin-shaped member 17b enters a fast-forwarding and rewinding portion of a Y-shaped groove 1a of the head plate 1 to check the rotation of the rewinding control plate, so that the roller 9b is maintained at the stop portion of and cannot move from the large radius portion toward the center of the cam of the intermittent gear. Thus, the lock portion 17a holds the power plate at the stand-by position on behalf of the rewinding plunger under circumstances where the latter does not.

(vi) Position Control Means (FIGS. 1 through 8)

The upper ends of the control plates 17F and 17R each have a pin-shaped position control member 17b inserted in the Y-shaped position control slot 1a formed in the head plate 1. The slot 1a comprises a play mode control portion with a relatively long stroke corresponding to one branch of the letter Y, and a fast-forwarding and rewinding control portion with a relatively short stroke corresponding to the other branch of the letter Y. The position control members 17b enter one of the branch slots determined by rotation angles of the control plates 17F and 17R, and can abut the bottoms thereof to control the advance stroke of the head plate 1.

The control plates 17F and 17R carry fast-forwarding and rewinding idlers (not shown) rotatably supported by axles at the ends opposite to the position control members 17b. When the idler engages a reel base and a flywheel due to rotation of the control plate, the fast-forwarding or rewinding mode is established.

Figure 11:
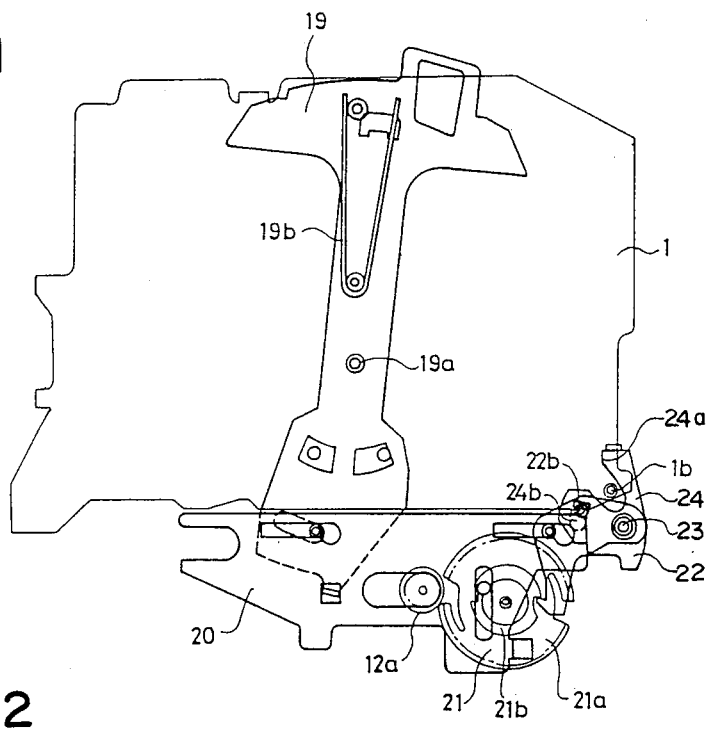
FIGS. 11 and 12 are plan views of a program change system for the mechanism of FIG. 1 at its right and left activated positions, respectively.
Figure 12:
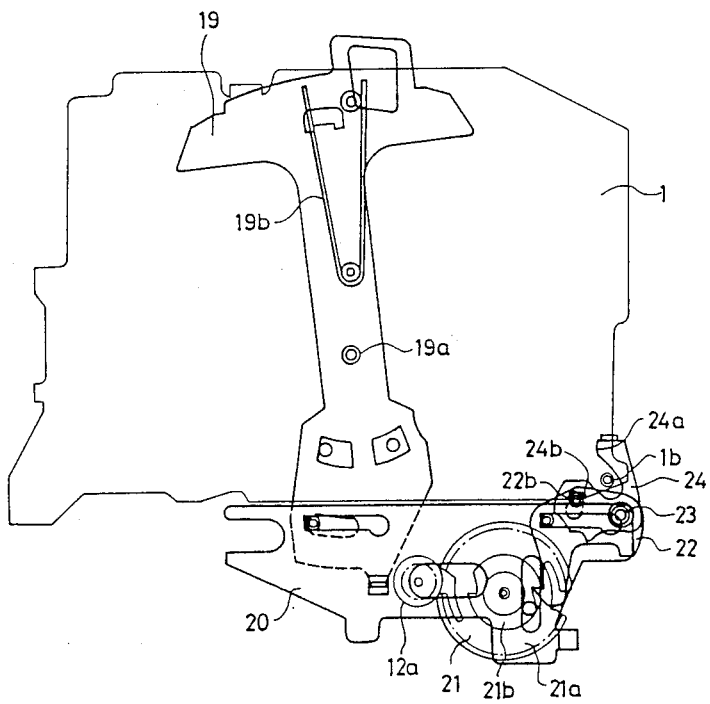

(vii) Change Plate (FIGS. 11 and 12)

A change plate 19 is a T-shaped member extending up and down in the figures, and is pivotable right and left about an axle 19a. The change plate 19, however, is normally biased by a V-shaped spring 19b to take a central position.

When the change plate 19 is placed right or left, and if the head plate 1 is moved ahead, one of two pinch rollers is brought into pressure contact with an associated capstan shaft, and the associated idler gear is engaged with the reel base and the drive gear 12a. The change plate is driven by a connection plate 20 reciprocated right and left in the figures by a change gear 21 which will be described later.

The change gear 21 comprises an outer intermittent gear 21a engageable with the drive gear 12a and having two symmetrical non-toothed portions, and an inner cam 21b having two symmetrical engage portions aligned with the non-toothed portions. When the change gear 21 engages the drive gear 12a, it is rotated a half revolution and brings the connection plate 20 from the right to the left or vice versa (and hence rotates the change plate 19 in the same direction) to effect a program change. The change gear 21 is locked at this position by a change gear lock plate 22 engaging the engage portion of the cam 21b, so as to place the non-toothed portion of the intermittent gear 21a at the drive gear 12a.

The change gear lock plate 22 is rotatably mounted on the base plate of the tape player by an axle 22a so that it locks the change gear 21 when rotated clockwise and unlocks it when rotated counterclockwise. The other end of the change gear lock plate 22 has formed a connection pin 23 supporting a position detecting link 24 which will be described later.

(viii) Position Detecting Means (FIGS. 14 through 19)

The position detecting link 24 is pivotable about the connection pin 23, and comprises an arm extending upward in the figures to engage the head plate 1 and an arm extending downward to engage the change gear lock plate 22. The distal end of the upper arm has formed a to-be-locked portion 24a which engages a position detecting pin 1b to lock the link 24 at a clockwise rotated position. The distal end of a lateral arm of the link 24 has formed an engage hole 24b receiving an engage pin 22b of the change gear lock plate 22. A spring 25 is connected between the connection pin 23 and the base plate of the tape player to bias the connection pin 23 downward in the figure (and the change gear lock plate 22 in the locking direction). A spring 26 is connected between the distal end of the upper arm of the link 24 and the engage pin 22b of the plate 22 to approach them toward each other (and therefore biases the link 24 counterclockwise). The link 24 is locked at a clockwise rotated position while the head plate 1 is placed at the retreat position (at the upper position in the figures) because the to-be-locked portion 24a is caught by the position detecting pin 1b of the head plate 1, but it is unlocked and allowed to rotate counterclockwise with the energy of the spring 26 while the head plate 1 is at the advance position (at the lower position in the figures) because the position detecting pin 1b enters in a relief portion or recess between the arms of the link 24. Thus the engage pin 22b of the plate 22 engages the clockwise end of the engage hole 24b of the link 24.

The lateral arm of the position detecting link 24 has formed an engage projection 24c engageable with the power plate 9. The projection 24c simply engages an engage pin 27 formed at one end of the power plate 9 when the link 24 is located at the counterclockwise rotated position (when the head plate 1 is placed at the play position). In the going movement (rightward movement) of the power plate 9, the position detecting link 24 is pushed counterclockwise, and the link 24 and plate 22 both rotate counterclockwise about the axle 22a of the change gear lock plate 22 (and the change gear 21 is unlocked). In the returning movement (leftward movement) of the power plate 9, the position detecting link 24 is pushed clockwise, and the engage pin 22b is movable in the engage hole 22b to allow the link 24 to rotate alone.

(2) Operation of the Embodiment

Figure 1:
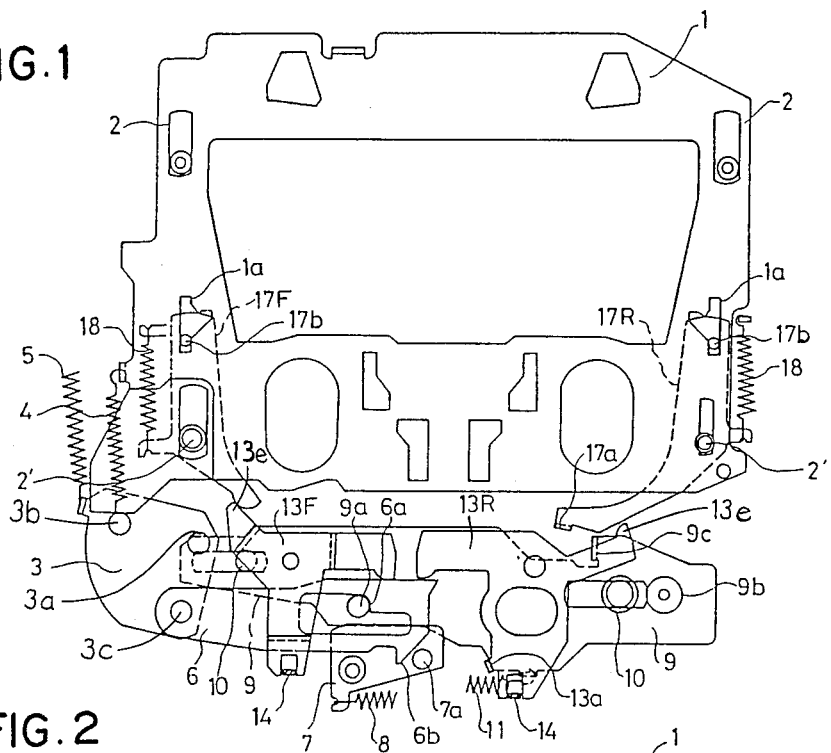
FIG. 1 is a plan view of a diagrammatic plunger operating mechanism embodying the invention, the mechanism being disposed in the stop mode.

(i) Stop Mode (FIG. 1)

In the stop mode of the tape player, with the motor and the two plungers deenergized, the fast-forwarding and rewinding stress plates 13F and 13R are both free. The head plate 1 is maintained at the stop position (at the upper position in the figures) due to the energy of the spring 5 applied thereto via the link 3. Therefore, the position control members 17b of the fast-forwarding and rewinding control plates 17F and 17R are positioned at the proximal (bottom) portion of the Y-shaped position control holes 1a at the right and left of the head plate 1, so as to rotate the fast-forwarding and rewinding control plates outward of the head plate 1 against the energy of the springs 18.

The power plate 9 is free because the rewinding stress plate 13R engaging therewith is free, and the lock portion 17a at the proximal end of the rewinding control plate 17R is apart from the projection 9c of the power plate 9. Therefore, the power plate 9 is pulled to the left in the figures by the spring 11 to put the roller 9b at the small radius portion of the cam 12b. At that time, the intermittent gear 12 stands still at an angular position where the teeth thereof have just entered in engagement with the drive gear.

On the other hand, the change gear 21 is locked by the change gear lock plate 22 which now engages one of the engage portions of the cam 21b, and the change plate 19 is maintained at the right position via the connection plate 20. The position detecting link 24 is locked at a clockwise rotated position by the position detecting pin 1b of the head plate 1 so as to put the engage pin 22b of the change gear lock plate 22 at the counterclockwise end of the engage hole 24b.

Since the head plate 1 is at the retreat position, the tape drive system (not shown, such as pinch rollers, capstan shafts and reel bases) is deactuated.

Figure 2:
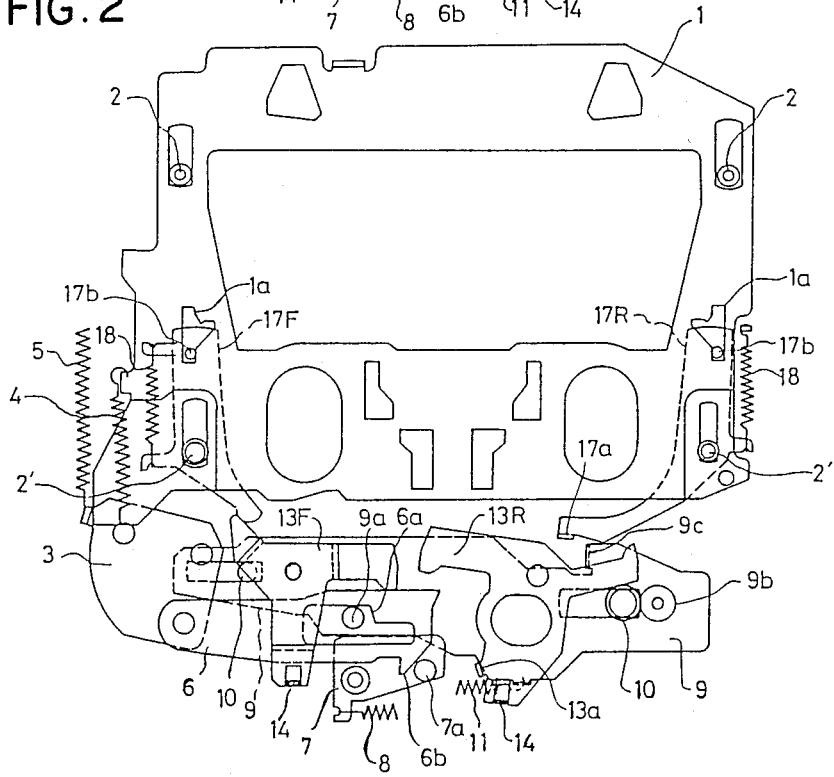
FIG. 2 is a plan view of the mechanism of FIG. 1 and disposed at the start of change to the play mode.

(ii) Start of Play (Change to Play from Normal Stop Mode . . . FIGS. 2 and 3)

With energization of the motor and an instruction "Play", both plungers are energized. Since the fast-forwarding stress plate 13F is freely pivotable at this time, the link 14 linked thereto is also rotated so that the core thereof is attracted by the attractive plunger 15F. The rewinding stress plate 13R, however, is not pivotable and not attracted by the plunger 15R because the lock portion 13a thereof is prevented from moving from the position of FIG. 2 to the position of FIG. 1 by the power plate 9 which is now positioned at the left in the figures. Therefore, the head lock plate 6 is stressed only by the stress portion of the distal end of the fast-forwarding stress plate 13F and maintained not pivotable upward in the figures.

In this state, the intermittent gear 12 which has been statically in engagement with the drive gear 12a is rotated due to energization of the motor, and the roller 9b is gradually pushed by the large radius portion of the cam 12b with rotation thereof. Thus the power plate 9 is moved to the right in the figures.

With this displacement of the power plate 9, the projection 9a thereof abuts the tapered engage portion 6a of the head lock plate 6 and pulls the plate 6 to the right. The projection 9a never fails to catch the engage portion 6a and hence pull the head lock plate 6 because the head lock plate 6 is stressed downward by the fast-forwarding stress plate 13F.

Due to the rightward displacement of the power plate 9, the rewinding stress plate 13R which has been compressed by the power plate 9 becomes free, is pivoted by spring 16, and is attracted by the plunger 15R. Thus the head lock plate 6 is now stressed by both stress plates 13F and 13R.

With this movement of the head lock plate 6, the head plate 1 connected thereto via the link 3 moves ahead.

Figure 4:
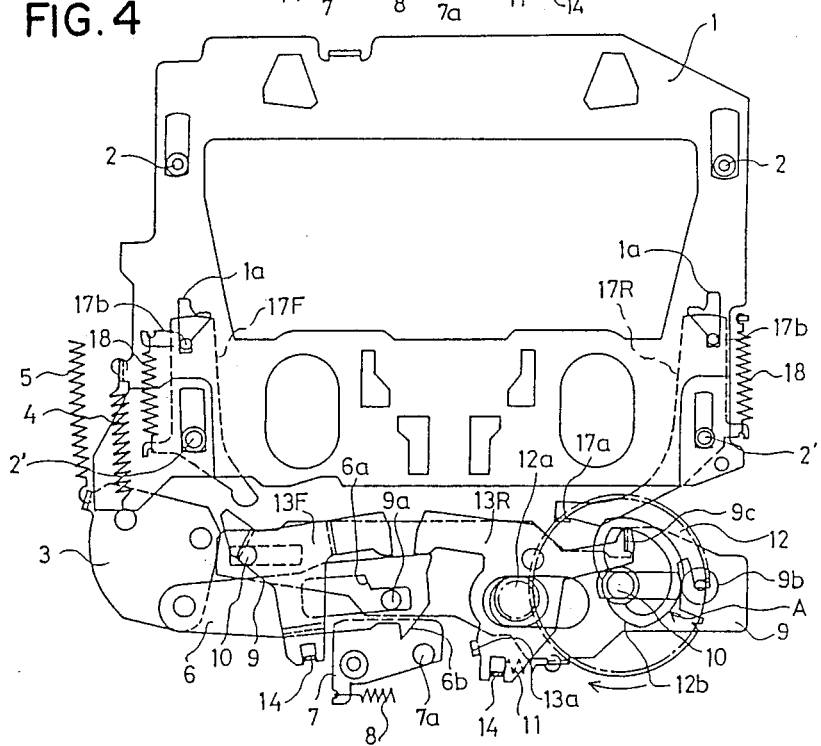
FIG. 4 is a plan view of the mechanism of FIG. 1 and disposed in the key-off stop mode where various members remain halfway through normal movements.

(iii) Start of Play from Key-Off (FIG. 4)

The aforegoing start of play is to establish the play mode from the normal stop mode established by a user's "stop" operation where the power plate ends up at the left end. The stop mode, however, may be established by a direct deenergization of the power source. Car tape players, in particular, are often set at the stop mode by simply removing the key of the car (it is called "key-off"), with no operation to the tape player itself. By such key-off, the power source is cut regardless of the mode that the tape player then takes. For example, the power source might be cut while the power plate 9 moves ahead (to the right in the figures) and the drive gear engages an intermediate portion of the intermittent gear spaced from the non-toothed portion. In this case, since the two plungers become deenergized, the head plate 1 which was locked thereby retreats to the stop position because head lock plate 6 is now able to pivot upwardly. However, the power plate stops at a half position because the intermittent gear linked to the deenergized motor via the drive gear stops.

Applying thereafter the power source and giving the instruction of "play" to the tape player in the stop mode by the key-off, the power plate 9 which has remained halfway resumes the rightward movement. In this case, the head lock plate 6 was rotated upward in the figures together with both stress plates which have escaped upward upon removal of the power source, so as to receive the push projection 9a of the Power plate in the relief portion 6b. Therefore, the head lock plate 6 and the link 3 do not move regardless of the movement of the power plate 9, and the head plate does not yet move ahead, either.

With a further rotation of the intermittent gear the roller 9b of the power plate passes over and drops from the summit of the cam, and the leftwardly moving push projection 9a reaches the tapered engage portion 6a of the head lock plate 6, the head lock plate 6 becomes pivotable, and the stress plates 13F and 13R are ready to be attracted. At this time, a clearance exists between the lock portion 13a of the stress plate 13R and the power plate 9 to never disturb the attraction of the stress plates. Subsequently, the plunger 15R is attracted, and the power plate 9 abuts the lock portion 13a of the stress plate 13R and stops at the same position as in the stop mode of FIG. 1. As described above, simply with concurrent energization of both plungers in the attempt to establish the play mode from the key-off stop mode, the power plate 9 stops before the head plate 1 moves ahead, and rather establishes the stop mode.

In this connection, the present embodiment then momentarily deenergizes the rewinding plunger after both plungers are once energized, so as to unlock the power plate 9 and reengage the intermittent gear with the drive gear to move the power plate again to the right. Thus the mechanism effects the same operation as taken in (ii) above the establish the play mode from the normal stop mode.

When the rewinding plunger is deenergized and releases the stress plate 13R, the power plate 9 is moved to the left by the spring 11, and the roller 9b drops along the call-in portion of the cam 12b, pushing and rotating the intermittent gear into engagement with the drive gear. The intermittent gear is thereafter driven by the drive gear and moves the power plate to the right together with the link 3 and the head plate 1.

Figure 5:
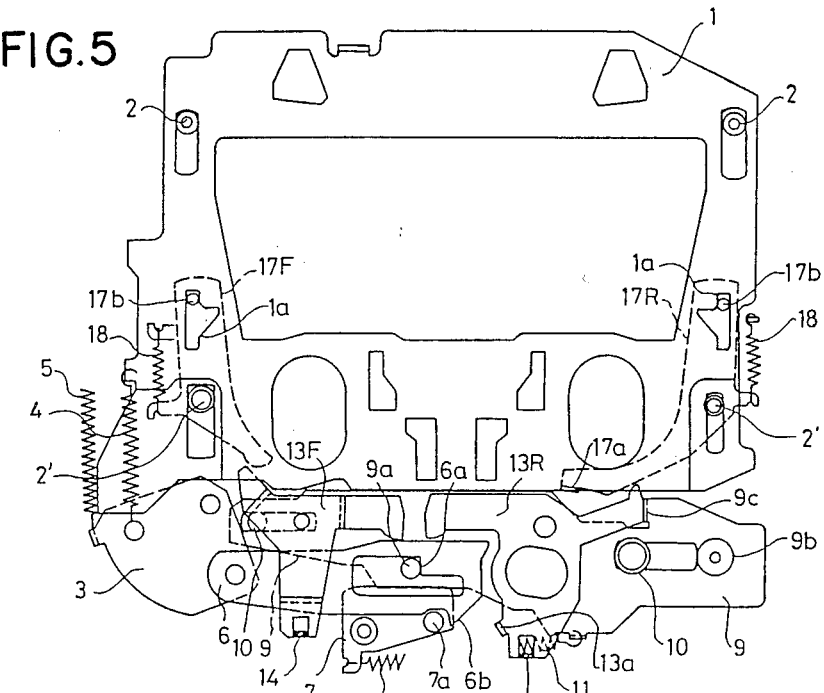
FIG. 5 is a plan view of the mechanism of FIG. 1 and disposed in a state just before the play mode.
Figure 6:
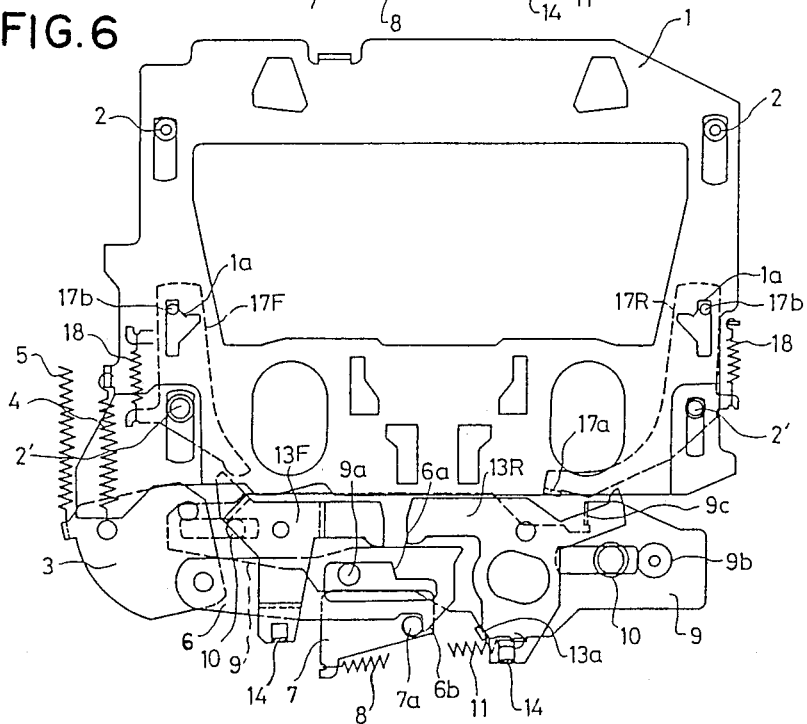
FIG. 6 is a plan view of the mechanism of FIG. 1 and disposed in the play mode.

(iv) Play Mode (FIGS. 5 and 6)

As described in (ii) and (iii) above, the head lock plate 6 moves to the right, and the head plate 1 begins to move ahead. Since both stress plates are then attracted by the plungers, the fast-forwarding and rewinding control plates 17F and 17R are compressed by the stress plates and rotated against the springs 18 to angular positions to put the position control members 17b outside. Therefore, with the advance of the head plate 1, each position control member 17b enters in the play mode portion of the Y-shaped position control hole 1a (the outward branch of the Y) so as to allow the head plate 1 to fully move ahead to the play position.

The head lock plate 6 moves ahead together with the head plate 1, and the hook-shaped engage portion 6b at the distal end thereof pushes the engage member 7a of the lock plate 7 to entirely rotate the lock plate 7 clockwise against the spring 8. With a further movement of the head lock plate 6 until the hook-shaped engage portion 6b passes over the engage member 7a, the lock plate 7 is rotated back to the original position by the spring 8 and engages the inner edge of the hook-shaped engage portion 6b to prevent the head lock plate 6 from moving back to the left. Accordingly the head plate 1 linked to the head lock plate 6 is also fixed at the advance position.

On the other hand, after the head lock plate 6 is fixed at the advance position of the head plate 1, the power plate 9 having pulled the plate 6 moves back to the left because the roller 9b passes over the large radius portion of the cam 12b. Therefore, the push projection 9a comes apart from the engage portion 6a of the head lock plate 6. With a further rotation of the intermittent gear until the non-toothed portion reaches the drive gear 12a, the power plate 9 is locked by the then attracted rewinding stress plate 13R. Therefore, the plate 9 loses the power from the drive gear and stops at the position.

When the head plate 1 completes its advance, the position detecting pin 1b thereof enters in the relief portion of the position detecting link 24 and permits it to rotate counterclockwise with the energy of the spring 26. Therefore, in returning leftward movement of the power plate 9, the engage pin 27 thereon engages the engage projection of the position detecting link 24 and rotates it clockwise. In this case, however, the change gear lock plate 22 does not move and never unlocks the change gear 21 because the engage pin 22b escapes counterclockwise in the engage hole 24b of the position detecting link 24. After the engage projection 24c passes over the engage pin 27, the position detecting link 24 returns counterclockwise with the energy of the spring 26.

Close contact of the pinch rollers to the capstan shafts and connection of the driving idler to the reel base in the play mode are effected in the advance position of the head plate by a control member provided on the head plate. There are various prior art mechanisms proposed for this purpose, and they are not explained here because the invention apparatus may employ any one of them.

Figure 7:
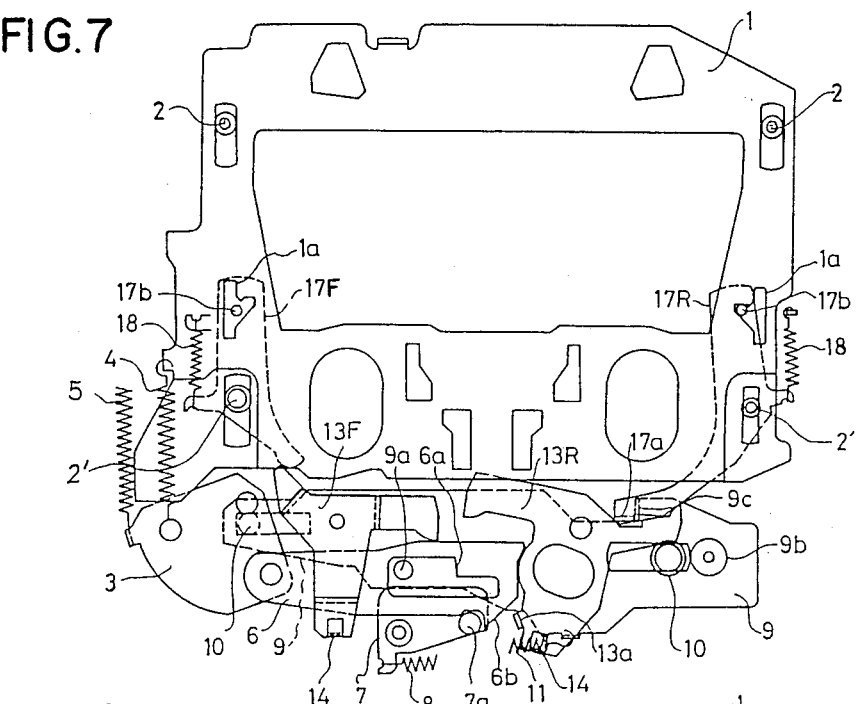
FIG. 7 is a plan view of the mechanism of FIG. 1 and disposed in the fast-forwarding mode.

(v) Fast-forwarding Mode (FIG. 7)

To establish the fast-forwarding mode in the invention tape player, any mode is first changed to the stop mode and thence changed to the fast-forwarding mode.

More specifically, to select the fast-forwarding mode, the power source is enabled and the motor is driven. Concurrently, the fast-forwarding plunger 15F is powered off and rewinding plunger 15R is energized.

Thus the fast-fowarding stress plate 13F becomes free, and the operating portion 13a thereof does not compress the fast-forwarding control plate 17F. Therefore, the fast-forwarding control plate 17F rotates clockwise with the energy of the spring 18 so that the position control member 17b at the distal end thereof enters in the inner branch with a shorter stroke in the Y-shaped position control hole 1a of the head plate 1. Since the energy of the spring 18 is larger than the plunger attraction spring 16, the control plate 17F is pivotable inward unless the plunger is attracted.

On the other hand, the rewinding stress plate 13R attracted by the plunger compresses the rewinding control plate 17R against the spring 18 and places it at the same position as in the play mode. When the head lock plate 6 is engaged by the rewinding stress plate 13R so as to not escape upward, and the power plate 9 is moved by the intermittent gear 12 with rotation of the motor, and the head plate 1 is moved ahead via the head lock plate 6 and the link 3.

The advance and lock of the head plate 1 are effected in substantially the same manner as in the play mode except that it does not advance to the play position and stops at a position to put the head in a slight contact with the tape because the position control member 17b of the fast-forwarding control plate 17F enters in the shorter branch in the position control hole 1a of the head plate 1. In this case, since the power plate in the drive system moves the same distance as in the play mode, the advance stroke of the head plate 1 is shorter than the stroke of the drive system due to the restriction of the position control means. In this connection, the present embodiment uses a spring 4 connected between the head plate 1 and the link 3 to resiliently meet the change in distance between the head plate 1 and the drive system.

A control member provided on the head plate 1 prevents the pinch rollers and the reel base driving idler from taking the play positions unless the head plate 1 fully advances.

On the other hand, when the fast-forwarding control plate 17F is rotated inward of the head plate 1 by the spring 18, the fast-forwarding idler (not shown) provided thereon engages, for example, a gear along the circumference of a flywheel and a gear along the circumference of a reel base, thereby rotating the reel base at a high speed and establishing the fast-forwarding mode.

In a change from the key-off stop mode to the fast-forwarding mode, the rewinding plunger once energized is momentarily deenergized, as in the change to the play mode from the key-off stop mode, to unlock and activate the power plate to move the head lock plate ahead.

Figure 8:
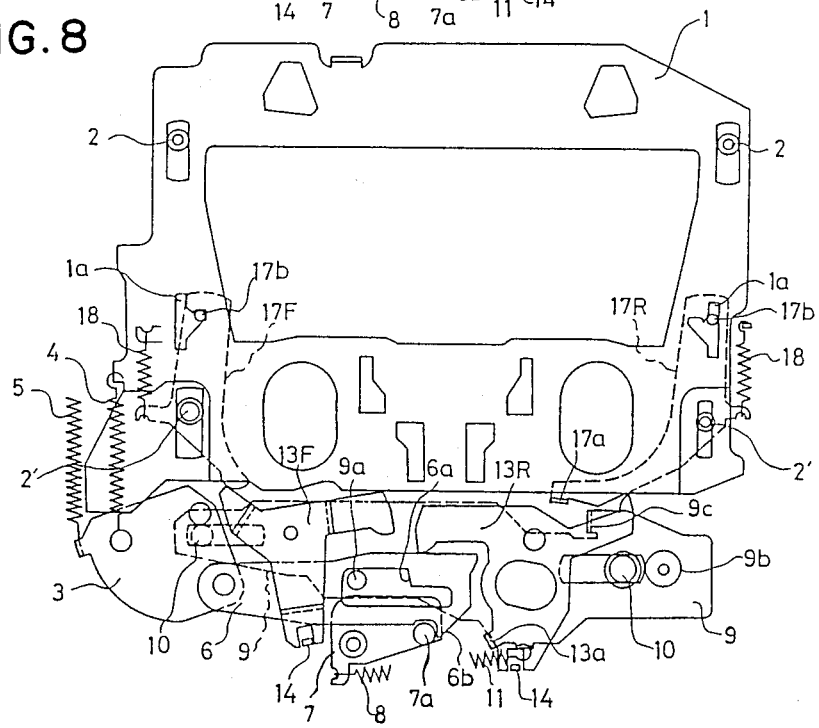
FIG. 8 is a plan view of the mechanism of FIG. 1 and disposed in the rewinding mode.
Figure 9:
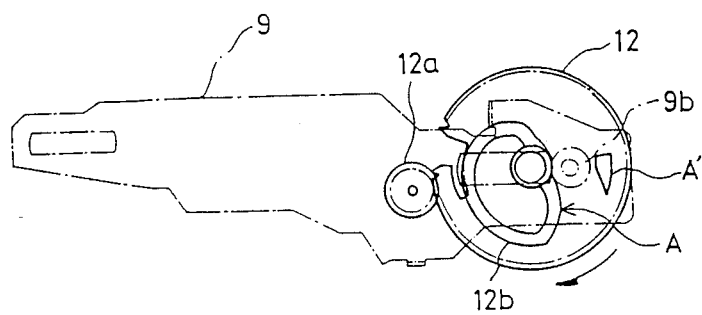
FIG. 9 is a plan view of a drive system for the mechanism of FIG. 1.

(vi) Rewinding Mode (FIG. 8)

In selection of the rewinding mode, the rewinding plunger is powered off and the fast-forwarding plunger is energized, contrary to the fast-forwarding mode.

The head lock plate 6 is compressed by the fast-forwarding stress plate 13F so that the power pltae 9 makes the head plate 1 advance via the link 3.

The advance stroke of the head plate 1 is controlled because the rewinding control plate 17R released from the stress plate 13R is allowed to rotate with the energy of the spring 18 to enter the position control member 17b thereof in the shorter branch of the position control hole 1a of the head plate 1. The pinch rollers, the play mode idler and the rewinding idler are controlled by the advance stroke of the head plate 1 and the rotation of the rewinding control plate, as in the fast-forwarding mode.

An important problem in the rewinding mode is that the rewinding stress plate is free and cannot fix or stop the power plate, whereas, in the other modes, the power plate 9 which has brought the head plate 1 ahead and has reached the stop position (to locate the non-toothed portion of the intermittent gear at the drive gear) is engaged and fixed by the lock portion 13a of the rewinding stress plate 13R which is then fixed by the plunger.

In this connection, the present embodiment brings the lock portion 17a of the rewinding control plate 17R in engagement with a projection 9c of the power plate 9 when the rewinding control plate 17R is rotated to the rewinding position by the spring 18, thereby pulling the head lock plate 6 and subsequently fixing the leftwardly returning power plate 9 at the stop position.

(vii) Stop Mode (FIG. 1)

To establish the stop mode from the play, fast-fowarding or rewinding mode, the power source is removed from both plungers and the motor.

Either or both of the fast-forwarding and rewinding stress plates which have been fixed by the plungers become free and cannot fix the head lock plate 6. Therefore, the head lock plate 6 retreats together with the head plate 1 linked thereto via the link 3 with the energy of the stop mode spring 5. In this case, the hook-shaped engage portion 6b at the distal end of the head lock plate 6 disengages from the roller-shaped engage member 7a of the lock plate 7 because the tapered engage portion 6a of the head lock plate 6 slides and moves upward in the figure along the push projection 9a of the power plate 9.

Concurrently, the rewinding stress plate 13R becomes free to disengage the lock portion 13b thereof from the power plate 9 in the play and fast-forwarding modes, and the rewinding control plate 17R is rotated clockwise in the figure by the position control hole 1a of the head plate 1 at the retreat position so that the lock portion 17a thereof disengages from the projection 9c of the power plate 9. As the result, the power plate 9 also becomes free and is pulled to the left by the spring 11 so that the roller 9b thereof compresses the cam 12b to move the non-toothed portion of the intermittent gear 12 and engage the toothed portion with the drive gear.

The aforegoing description explains the stop mode responsive to the normal "stop" instruction. In a change to the stop mode from the play, fast-forwarding or rewinding mode by direct removal of the power source (key-off), the mechanism effects the substantially same operations, except that, as described in (iii) above, if the source power is removed during a change to a mode, the intermittent gear and the power plate stop halfway although the head plate fully retreats.

(viii) Program Change Mode (FIGS. 11, 12 and 17 through 19)

To establish the program change mode from the play mode, the rewinding plunger 17R, which was first energized together with the fast-forwarding plunger, is momentarily deenergized. The power plate 9 which has been locked by the lock portion 17a of the plunger 17R is allowed to move to the left with the energy of the call-in spring 11, and brings the intermittent gear linked thereto into engagement with the drive gear, so that the power plate 9 is reciprocated by rotation of the intermittent gear. The reciprocation of the power plate activates the program change mechanism in the following manner.

In the play mode, since the position detecting link 24 is placed at the counterclockwise rotated position, the pin 27 of the power plate 9 engages the engage projection 24c due to the reciprocation of the power plate 9. In the leftward going stroke of the power plate 9, the position detecting link 24 is compressed and rotated counterclockwise together with the change gear lock plate 22 about the axle 22a of the plate 22, and unlocks the change gear 21. The change gear 21 then engages the drive gear 12a and rotates to move the change plate 19 to the left via the connection plate 20.

At that time, the calling guidance of the change gear 21 is effected by the energy of a V-shaped spring 19b biasing the change plate 19 to the central position. More specifically, the spring energy slightly moves the change plate 19 and hence the connection plate 20 and invites a further movement of the power plate which rotates the change gear 21 until the engage pin 27 thereof passes over the engage projection 24c of the position detecting link 24 and permits it to return again. Due to this, the change gear lock plate 22 is also going to return in the same direction, but first slides on the cam because the change gear 21 is then rotating. When the power plate 9 completes the advance, the change plate 19 completes the leftward movement, and the change gear 21 rotated by a half revolution is locked again by the change gear lock plate 22.

When the power plate 9 subsequently returns back to the original position, it is locked by the rewinding plunger 17R which is energized again. Therefore, the play mode is restored after the program change operation is completed.

In the mechanism in the above-described embodiment, the attractive plungers control the connection between the head plate during its advance and the drive system, and control the lock of the head plate at the advance position and the unlock therefrom. The drawings illustrate the most excellent relationships between various members to reliably engage and disengage the engage member 7a with and from the hook-shaped engage portion 6b of the head lock plate by simply energizing or deenergizing the attractive plungers.

Figure 13A:
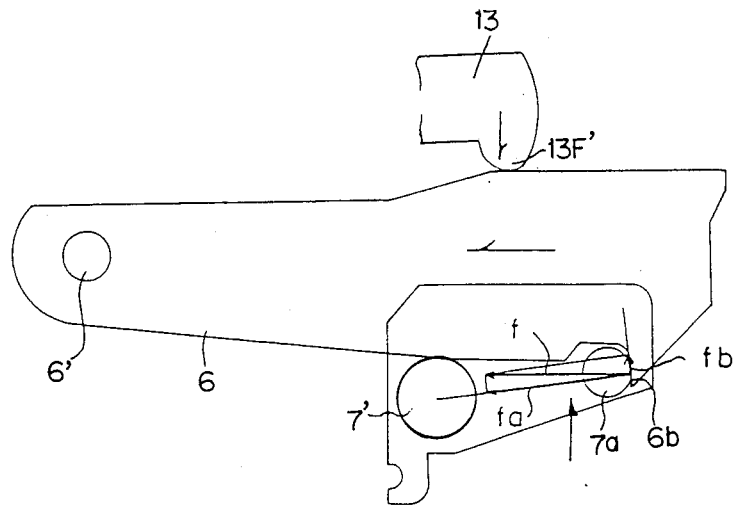
FIGS. 13A and 13B are plan views showing energy relationships between an engage portion and an engage member upon full advance and release of a head plate in the mechanism of FIG. 1.
Figure 13B:
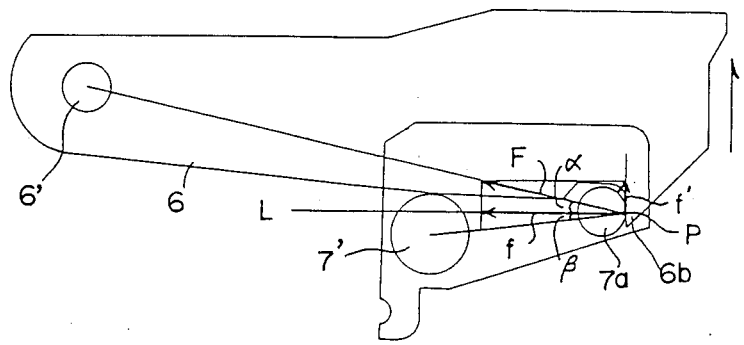

This is explained hereunder, referring to FIGS. 13A and 13B.

FIG. 13A shows that the head lock plate 6 is fixed unrotatable upward by the stress plate 13F attracted by the attractive plunger. Therefore, the energy of the withdrawal spring 5 applied to the head lock plate 6 via the link 3 acts on the engage member 7a contacting the hook-shaped engage portion 6b in the leftward direction, perpendicular to the edge of the engage portion 6b. Expressing this force by f, the force component fa normal to the axle 7' of the engage member 7a is supported by the axle 7', and the engage member 7a receives the force component fb perpendicular to the force component fa. Since the contact point P between the engage portion 6b and the engage member 7a is positioned inward of the axle 7' with respect to the engage portion 6b, the force component fb serves to bias the engage member 7a upwardly into the engage portion 6b. Therefore, the engage member 7a biased by the force component fb as well as the energy of the spring 14 is urged into the engage portion 6b to reliably maintain the engagement between them.

On the other hand, when the head lock plate 6 is released, the attractive plunger is deenergized and releases the stress plate 13F. However, since the engage member 7a is fully entered into the engage portion 6b, the head lock plate 6 does not disengage from the engage member 7a regardless of the release of the stress plate 13F unless the head lock plate 6 and the stress plate 13F rotate upward in the figure. In this connection, this embodiment selects the best placement of the respective members so that the spring provided for withdrawal of the head plate 1 helps to rotate the head lock plate 6 upward when no downward force is applied to the head lock plate 6.

More specifically, when the stress plate 13F loses the fixing force due to deenergization of the attractive plunger, the head lock plate 6 becomes free. Therefore, the energy of the withdrawal spring supplied via the link 3 is directed from the axle 6' of the head lock plate 6 to the engage point P between the engage portion 6b and the engage member 7a as shown in FIG. 13B. Expressing this force by F, the component f perpendicular of the edge of the engage portion 6b is supported by the engage member 7a, and the component f' parallel to the edge acts on the head lock plate 6 to rotate it upward. Beside this, the component f perpendicular to the edge and supported by the engage member 7a, which is different in magnitude but equal in direction to the force in stop mode is also divided into the component fa supported by the axle 7' of the engage member 7a and the component fb biasing the engage member 7a into the engage portion 6b in the same manner as FIG. 13A.

The engage force fb acting on the engage member 7a and urging it upwardly relative to the engage portion 6b can alternatively be treated as a force in the opposite direction acting on the engage portion 6b and urging it downwardly relative to the engage member 7a, namely a not-illustrated force fb' which has the same magnitude as and is opposite in direction to the force fb and which acts on the engage portion 6b. Thus, the engage portion 6b is urged upwardly by the force f' and is urged downwardly by the not-illustrated force fb' which is equal and opposite to the force fb.

In this case, the release force f' biasing the head lock plate 6 upward and the engage force fb' biasing the engage portion 6b downwardly relative to the engage member 7a have opposite directions. In this embodiment, however, the axle 6' of the head lock plate 6, the engage point P and the axle 7' of the engage member 7a have a positional relationship so that the release force f' is larger, and angles $\alpha$ and $\beta$ made by a line L perpendicular to the edge of the engage portion 6 and passing through the engage point P with respect to respective lines passing through the point P and the axles 6' and 7' have the relationship $\alpha > \beta$. More specifically, since the release force f' and the engage force fb' vary with variation of the angles between the line L and the lines through the axles, the angles between the line L and the lines through the axles are selected so that the release force f' is larger.

Strictly analyzing, the release force f' and the engage force fb' are not precisely opposite in direction (the release force is parallel to the edge of the engage portion whereas the engage force is perpendicular to the line between the engage point P and the axle 7'). Further the engage force is the re-divided force component of the force component f supplied from the link 3. Therefore, $\alpha > \beta$ is not requisite for $f' > fb'$. However, if $\alpha > \beta$, $f' > fb'$ is always established.

The aforegoing explanation disregards the force of the spring 14 which biases the engage member 7a toward the engagement. However, it does not matter because the energy of the spring 14 is much smaller than the force of the spring 6 for withdrawal of the head plate 1. Even with the spring 14 entered into consideration, the angles $\alpha$ and $\beta$ may be selected so that the release force f' exceeds the sum of the engage force fb' and the force of the spring 14.

OTHER EMBODIMENTS

The central concept of the invention is to use only two plungers to selectively establish the play, fast-forwarding, rewinding and stop modes. However, its detailed construction is not limited to the embodiment illustrated, but may be modified as follows.

(1) In a change from the key-off stop mode to the play mode, it is not indispensable to first energize both plungers and thence momentarily deenergize the rewinding plunger. In the event that the head plate does not advance regardless of the "play" instruction from the key-off stop mode in a modified construction omitting the momentary deenergization of the rewinding plunger, a user may first change it to the normal stop mode and thence give the "play" instruction again.

(2) The description of the illustrated embodiment states for a better understanding and a simpler explanation that plural switches are used to control the motor and the plungers. In practice, however, a microcomputer can be used to simultaneously energize or deenergize the motor or the plungers in response to operation of respective instruction switches provided outside the tape player.

(3) The illustrated embodiment uses the single head lock plate 6 to pull the head plate. However, two head lock plates may be individually provided in the fast-forwarding and rewinding mechanisms so as to pull the head plate by the both plates in the play mode and by a respective one of the plates in the fast-forwarding or rewinding mode.

(4) The illustrated combination of the hook-shaped engage portion and the lock plate as a means to lock the head lock plate may be replaced by a combination of a lock plate provided on the head lock plate and pivotably biased by a spring and an engage portion immovably fixed to the base plate of the tape player.

(5) In order to lock the power plate at the stop position after pulling the head lock plate, the illustrated embodiment uses a lock means comprising the rewinding stress plate to lock it in the play and fast-forwarding mode and the rewinding control plate to lock it in the rewinding mode. However, the fast-forwarding and rewinding stress plates and control plates may be used in the contrary. Alternatively, the lock in the rewinding mode may be effected by the fast-forwarding stress plate then attracted. It is also employable to lock it by the control plate in the fast-forwarding and rewinding modes and by one of the stress plates in the play mode. Another member may be interposed so that the power plate is indirectly locked by the stress plate or the fast-forwarding or rewinding control plate via such extra member.

The lock means may comprise other members such as the head plate itself brought to the advance position, the head lock plate linked to the head plate, or some members linked to the plungers.

In conclusion, since the power plate returns to the stop position after the tape player is changed to the play or fast-forwarding/rewinding mode, the power plate lock means may comprise any members which change their positions between the stop mode and other modes.

(6) The position control means to determine the advance positions of the head plate in the play mode and in the fast-forwarding/rewinding mode is not limited to the illustrated position control hole of the head plate.

The most similar modification to the illustrated construction is to employ the contrary relationship between the position control hole and the position control member inserted therein with respect to the fast-forwarding-/rewinding control plates and the head plate.

It is also possible to operatively link the position control means to the stress plates or both plungers, independently from the fast-forwarding/rewinding link operating the fast-forwarding/rewinding idler. In this case, the advance stroke of the head plate is controlled by constructing the position control member to take different positions when both stress plates or plungers are attracted and when only one of them is attracted. This construction is readily obtained by the same control technology employed in the illustrated embodiment to change the position of the head lock plate during attraction of one of the plungers and during deenergization of both plungers.

(7) Since the invention mechanism is adapted to controllably change the advance stroke of the head plate by the single head lock plate, as described in (6) above, it is necessary to meet the change in position of the head lock plate.

The illustrated embodiment connects the head plate and the link by the spring to meet the requirement. However, the head lock plate (or the link) may be divided into two segments connected to a spring so that the spring is expanded to increase the distance between the junction to the power plate and the junction to the head plate in the fast-forwarding and rewinding modes. Alternatively, if the construction permits, the push projection provided on the power plate to pull the head lock plate may be movably mounted on the power plate.

(8) The head lock plate pulling the head plate need not be indirectly linked to the head plate via the link 3. The head lock plate may be directly connected to the head plate provided that the pulling direction of the head lock plate coincides with the advance direction of the head plate.

In this connection, the stop mode spring to withdraw the head plate need not be provided on the head plate, but may be mounted on the head lock plate or a link therebetween if any.

(9) The illustrated combination of the intermittent gear and the power plate to drive the head lock plate may be replaced by a combination of a rack provided on the power plate and the drive gear driven by the motor and engageable with the rack.

EFFECTS OF THE INVENTION

As described above, the invention mechanism reduces the number of attractive plungers to two and selectively establishes all the necessary four modes of the tape player, i.e., stop, play, fast-forwarding and rewinding modes, with a simple construction including the two attractive plungers, the head lock plate, the means to control the position of the head plate and the fast-forwarding and rewinding control plates. The reduction of the attractive plungers provides a smaller-scaled tape player.

The embodiments of the invention in which an exclusive property or privilege is claimed are defined as follows:

1. A plunger operating mechanism in a tape player which can be selectively operated in a plurality of modes, including a fast-forwarding mode and a rewinding mode, comprising:
    a stop mode biasing element;
    a head plate supported for movement between an advance position and a withdrawal position, said head plate moving through a fast-forwarding and rewinding position as it moves in an advancing direction to said advance position from said withdrawal position, said head plate being yieldably biased by said stop mode biasing element toward its withdrawal position;
    a head lock plate operatively linked to said head plate;
    drive means engageable with said head lock plate for moving it to an ahead position in a direction which effects movement of said head plate toward said advance position;
    first lock means engageable with said head lock plate when said head lock plate has been moved to its ahead position by said drive means for releasably locking said head lock plate in said ahead position in order to releasably prevent said head plate from returning to its withdrawal position;
    first and second attractive plungers, said first plunger being respectively energized and de-energized and said second plunger being respectively de-energized and energized during said fast-forwarding and rewinding modes, respectively;
    two movably supported stress plates each cooperable with a respective one of said plungers so as to be releasably locked thereby in a predetermined position when such plunger is energized;
    fast-forwarding and rewinding control plates which are each moveable between first and second positions and are each engageable with a respective one of said stress plates;
    means which includes said stress plates for positioning said fast-forwarding control plate in its second position and said rewinding control plate in its first position in the fast-forwarding mode when said first of said plungers is energized, for positioning said fast-forwarding control plate in its first position and said rewinding control plate in its second position in the rewinding mode when said second of said plungers is energized, and for positioning both of said control plates in their first positions for modes other than the fast-forwarding and rewinding modes; and
    position control means which includes said control plates for limiting movement in said advancing direction of said head plate to its fast-forwarding and rewinding position in the fast-forwarding mode and in the rewinding mode.

2. A mechanism of claim 1 wherein said drive means comprises:
    a drive gear driven by a motor of the tape player;

an intermittent gear engageable with said drive gear and having a non-toothed portion, said intermittent gear being intermittently rotated by said drive gear;
a cam rotated by said intermittent gear;
a power plate supported for reciprocal movement and having a portion engageable with said cam, and resilient means yieldably urging movement of said power plate in a direction causing said portion thereof to be urged against said cam, wherein when said non-toothed portion of said gear is angularly aligned with said drive gear, forces from said resilient means exerted on said cam by said portion of said power plate urge rotation of said cam and intermittent gear to an angular position in which said drive gear is in driving engagement with said intermittent gear, and wherein rotation of said cam causes said power plate to be reciprocated by said cam; and
second lock means engageable with said power plate for releasably locking it at a position in which said portion thereof is spaced from said cam at a time when said non-toothed portion of said intermittent gear is angularly aligned with said drive gear.

3. A mechanism of claim 1, wherein said head lock plate is supported for pivotal movement about an axis and has a hook-shaped engage portion provided at a distal end thereof, wherein said first lock means includes a pivotally supported engage member disposed near said engage portion and biased by a spring into engagement with said engage portion, wherein an inner edge of said hook-shaped engage portion which is engageable with said engage member extends substantially perpendicular to the direction in which said head lock plate is moved by said drive means, wherein the pivot axes of said head lock plate and said engage member are disposed on opposite sides of a first line which passes through a point of contact between said hook-shaped engage portion and said engage member and which extends perpendicular to said edge of said engage portion, and wherein an angle of a second line which extends between said point of contact and said axis of said head lock plate with respect to said first line is larger than an angle of a third line which extends between said point of contact and said axis of said engage member with respect to said first line.

4. A mechanism of claim 1, wherein said position control means includes resilient means for yieldably urging movement of each said control plate to its second position and includes means for moving each said control plate to its first position when said head plate is in its withdrawal position, and wherein said means for positioning said control plates includes each said stress plate, when releasably locked in its predetermined position by the associated plunger, engaging a respective one of said control plates and maintaining the control plate in its first position.

5. A plunger operating mechanism in a tape player comprising:
a drive gear driven by a motor of the tape player;
an intermittent gear engageable with said drive gear and having a non-toothed portion, said intermittent gear being intermittently rotated by said drive gear;
a cam provided on said intermittent gear;
a power plate supported for reciprocal movement and having a portion engageable with said cam, and resilient means yieldably urging movement of said power plate in a direction causing said portion thereof to move toward said cam, wherein when said non-toothed portion of said intermittent gear is angularly aligned with said drive gear, forces from said resilient means exerted on said cam by said portion of said power plate urge rotation of said cam and intermittent gear to an angular position in which said drive gear is in driving engagement with said intermittent gear, and wherein rotation of said cam causes said power plate to be reciprocated by said cam;
a head plate supported for movement between an advance position and a withdrawal position, said head plate moving through a fast-forwarding-/rewinding position as it moves in an advancing direction to said advance position from said withdrawal position;
engage means for releasably coupling said power plate to said head plate, said engage means effecting movement of said head plate in said advancing direction in response to movement of said power plate in one direction by said cam;
first hold means which, when activated, causes said engage means to effect said releasable coupling of said power plate and said head plate;
second hold means which, when activated, releasably maintains said head plate at one of said advance position and fast-forwarding/rewinding position;
selectively energizable first and second plungers which each, when energized, activate each of said first and second hold means; and
lock means for releasably locking said power plate in a position in which said portion thereof is spaced from said cam on said intermittent gear after said power plate has moved said head plate to one of said advance position and said fast-forwarding-/rewinding position, so that rotation of said intermittent gear will cease when said non-toothed portion thereof subsequently becomes angularly aligned with said drive gear.

6. A mechanism of claim 5, wherein the tape player can be selectively operated in a plurality of modes which include a play mode, a fast-forwarding mode, and a rewinding mode, wherein both of said plungers are energized in the play mode of the tape player, wherein said first and second plungers are respectively energized and de-energized in the fast-forwarding mode of the tape player, and wherein said first and second plungers are respectively de-energized and energized in the rewinding mode of the tape player.

7. A mechanism of claim 5 further comprising a program change mechanism which, when driven, reverses a direction in which a tape is moved by the tape player, and a position detecting mechanism which, when the head plate is in its advance position for the play mode, drives said program change mechanism in response to movement of said power plate, wherein said second plunger can be momentarily de-energized during the play mode and in response to such deenergization said lock means releases said power plate so that said power plate is moved by said resilient means into engagement with said cam on said intermittent gear during the play mode, said program change mechanism then being driven by said position detecting mechanism in response to movement of said power plate.

8. A mechanism of claim 4 wherein said position detecting mechanism comprises:

a change gear which has a non-toothed portion and is engageable with said drive gear, and means operative when said non-toothed portion of said change gear is aligned with said drive gear for urging said change gear to rotate until engaged with said drive gear, said program change mechanism being responsive to rotation of said drive gear for reversing the direction of tape movement;

a movable lock plate which can releasably lock said change gear against rotation in a position in which said non-toothed portion thereof is angularly aligned with said drive gear;

a position detecting pin provided on said head plate; and a position detecting link supported on said lock plate for movement between first and second positions relative thereto, said position detecting link being respectively engageable with and free of engagement with said power plate in said first and second positions of said link, said position detecting link being engaged by said position detecting pin and maintained thereby in said second position free from engagement with said power plate when said head plate is at its withdrawal position, and including means for moving said position detecting link to its first position when said position detecting link is disengaged from said position detecting pin, said position detecting link being disengaged from said position detecting pin and being engageable with said power plate when said head plate is at its advance position, wherein when said power plate is moved while said head plate is in its advance position said power plate moves said position detecting link which in turn moves said lock plate to effect unlocking of said change gear.

* * * * *

UNITED STATES PATENT AND TRADEMARK OFFICE
CERTIFICATE OF CORRECTION

PATENT NO. : 4 717 983
DATED : January 5, 1988
INVENTOR(S) : Yukio ITO et al

It is certified that error appears in the above-identified patent and that said Letters Patent is hereby corrected as shown below:

Column 18, line 67; change "claim 4" to ---claim 7---.

Signed and Sealed this

Thirteenth Day of September, 1988

*Attest:*

DONALD J. QUIGG

*Attesting Officer*  *Commissioner of Patents and Trademarks*